United States Patent
Haney

(10) Patent No.: US 11,767,722 B2
(45) Date of Patent: Sep. 26, 2023

(54) CHEMICAL TREATMENT TANK LEVEL SENSOR

(71) Applicant: DETECHTION TECHNOLOGIES, LLC, Houston, TX (US)

(72) Inventor: Virgil Haney, Houston, TX (US)

(73) Assignee: DETECHTION USA INC., Houston, TX (US)

( * ) Notice: Subject to any disclaimer, the term of this patent is extended or adjusted under 35 U.S.C. 154(b) by 359 days.

(21) Appl. No.: 16/742,081

(22) Filed: Jan. 14, 2020

(65) Prior Publication Data

US 2020/0256140 A1  Aug. 13, 2020

Related U.S. Application Data

(60) Provisional application No. 62/802,474, filed on Feb. 7, 2019.

(51) Int. Cl.
*E21B 21/08* (2006.01)
*E21B 43/25* (2006.01)
*E21B 43/12* (2006.01)
*G01F 23/16* (2006.01)

(52) U.S. Cl.
CPC ............ *E21B 21/08* (2013.01); *G01F 23/161* (2013.01); *E21B 43/12* (2013.01); *E21B 43/25* (2013.01)

(58) Field of Classification Search
CPC .............................. G05D 11/02; G05D 11/08
See application file for complete search history.

(56) References Cited

U.S. PATENT DOCUMENTS

| | | | |
|---|---|---|---|
| 5,634,522 A * | 6/1997 | Hershberger | E21B 47/009 166/372 |
| 7,263,448 B2 * | 8/2007 | Brown | G01F 1/007 702/50 |
| 7,878,250 B2 * | 2/2011 | Sheldon | E21B 47/10 702/45 |
| 9,476,743 B1 * | 10/2016 | Westmoreland | G01N 33/2847 |
| 10,472,255 B2 * | 11/2019 | Black | G01F 23/14 |
| 10,884,437 B1 * | 1/2021 | Black | E21B 33/068 |
| 11,009,897 B2 * | 5/2021 | Lauzon | G01L 9/125 |
| 2015/0268111 A1 * | 9/2015 | Hedtke | G01K 1/14 374/100 |
| 2017/0283239 A1 * | 10/2017 | Carapelli | B67D 7/08 |
| 2017/0283329 A1 * | 10/2017 | Xing | C04B 35/63416 |
| 2019/0242204 A1 * | 8/2019 | Skaugen | E21B 21/08 |
| 2021/0116272 A1 * | 4/2021 | Carpenter | G01L 19/0007 |

FOREIGN PATENT DOCUMENTS

CN   106945954 A  *  7/2017

* cited by examiner

*Primary Examiner* — Matthew Troutman
*Assistant Examiner* — Douglas S Wood
(74) *Attorney, Agent, or Firm* — Perkins Coie LLP

(57) ABSTRACT

A chemical tank level system for a wellbore chemical injection tank is provided. The system includes a pressure sensor is located downstream of the chemical injection tank where the fluidic pressure is essentially the same as the fluidic pressure at the base of the chemical tank. The pressure sensor sends a signal indicative of the fluidic pressure to a tank level sensor module. The tank level sensor module receives the signal from the pressure sensor. A processor takes a series of pressure sensor signals over a sample window and calculates an average of the signals over a defined time window.

20 Claims, 8 Drawing Sheets

CHEMICAL TREATMENT TANK LEVEL SENSOR

CROSS-REFERENCE TO RELATED PATENT APPLICATIONS

The present application claims the benefit of the filing of U.S. Provisional Application Ser. No. 62/802,474, filed Feb. 7, 2019, titled Chemical Treatment Tank Level Sensor, which application is incorporated herein by reference as if set out in full.

BACKGROUND

Hydrocarbon production generally involves a well or wellbore. The wellbore may be lined with a casing to allow equipment to be lowered into the wellbore to a downhole position. The equipment may be drilling equipment, pumping equipment, or the like as is generally known in the art.

The apparatuses, fluids, and introduced chemicals to the wellbore make the operating environment particularly harsh and corrosive. The well owner may introduce chemicals into the wellbore to facilitate operation, reduce corrosion, or clean the downhole devices and fluids. In some cases, trucks (generally known as treater trucks) with chemicals may be coupled to the drill string such that chemicals may be pumped directly from truck holding tanks to the wellbore. While effective, using trucks is sometimes problematic as it can be difficult to get the trucks to some remote locations. Additionally, the chemicals pumped into the wellbore, such as, for example, a foaming agent or corrosion inhibitor, may be overloaded by a batch treatment to make sure the treatment lasts until the next time the truck may be established at the pump house.

To combat the overtreatment and other inefficiencies of treater trucks, many well sites include an onsite chemical tank distribution system include an onsite chemical tank distribution system. The chemical tank distribution system generally has a chemical tank coupled to a discharge manifold. The chemical tank generally has a defined fluid volume with a known amount of a chemical contained in the fluid volume. A pump located downstream of the discharge manifold periodically injects a defined amount of the chemical to a downhole distribution point.

To ensure a proper amount of chemical, and a sufficient amount of fluid, is available, the processor that controls the injection requires, among other things, knowledge of the amount of fluid in the chemical tank. Traditionally, the chemical tank is provided with a pressure sensor. The pressure sensor determines the hydrostatic pressure at the bottom of the tank, and a processor uses the pressure to determine the fluid level. The tank level sensor provides information (or data signals) to the processor that controls the injections. The composition contained in the chemical tank, however, is frequently corrosive and/or reactive causing the tank level sensor to fail as the composition come into contact and/or leaks into the tank level sensor.

Thus, against the above background, it would be desirous to provide an improved tank level measurement apparatus and system.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In some aspects of the technology, a pressure sensor is provided in the discharge manifold downstream of an isolation valve and upstream of a pump intake, which may include a check valve in certain embodiments. The pressure sensor senses the fluidic pressure of the discharge manifold, which is essentially equal to the fluidic pressure at the base of the chemical tank. The pressure sensor sends a signal indicative of the fluidic pressure to a tank level sensor module. The tank level sensor module receives the signal from the pressure sensor. However, the processor may have no information regarding whether the downstream pump is drawing fluid from the chemical tank, which causes a pressure decrease in the discharge piping, or whether a check valve is shutting, also known as slamming, which causes a pressure increase or spike due to the shock wave. Thus, the processor takes a series of pressure sensor signals over a predefined time, or sample window, and calculates an average of the signals over a defined time window. The predefined time, or sample window, should be greater than at least one pump stroke and valve slam cycle. In certain embodiments, the predefined time, or sample window, should be greater than at least two pump stroke and valve slam cycles. In one implementation, the predefined time, or sample window, is at least 3 seconds (time unit) to no more than 7 seconds (time unit), which correspondence to about 3 pump stroke valve slam cycles to about 7 pump stroke valve slam cycles. In certain embodiments, the averaging process may comprise eliminating values from the averaging process that are above or below a threshold.

In some embodiments, the processor either determines whether the pump is stroking and delays the reading on the tank level until the chemical injection is completed and sufficient time has elapsed for the check valve to shut and the shock wave to dissipate. Alternatively, in other embodiments, the processor may turn the pump off and allow sufficient time for the check valve to shut and the shock wave to dissipate.

These and other aspects of the present system and method will be apparent after consideration of the Detailed Description and Figures herein.

DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

The technology of the present application will now be described more fully below with reference to the accompanying figures, which form a part hereof and show, by way of illustration, specific exemplary embodiments. These embodiments are disclosed in sufficient detail to enable those skilled in the art to practice the technology of the present application. However, embodiments may be implemented in many different forms and should not be construed as being limited to the embodiments set forth herein. The following detailed description is, therefore, not to be taken in a limiting sense.

The technology of the present application is described with specific reference to a chemical treatment tank level sensor for downhole chemical delivery in a hydrocarbon production facility. However, the technology described herein may be used with applications other than those specifically described herein. For example, the technology of the present application may be applicable to water treatment or the like. Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Figure 1:
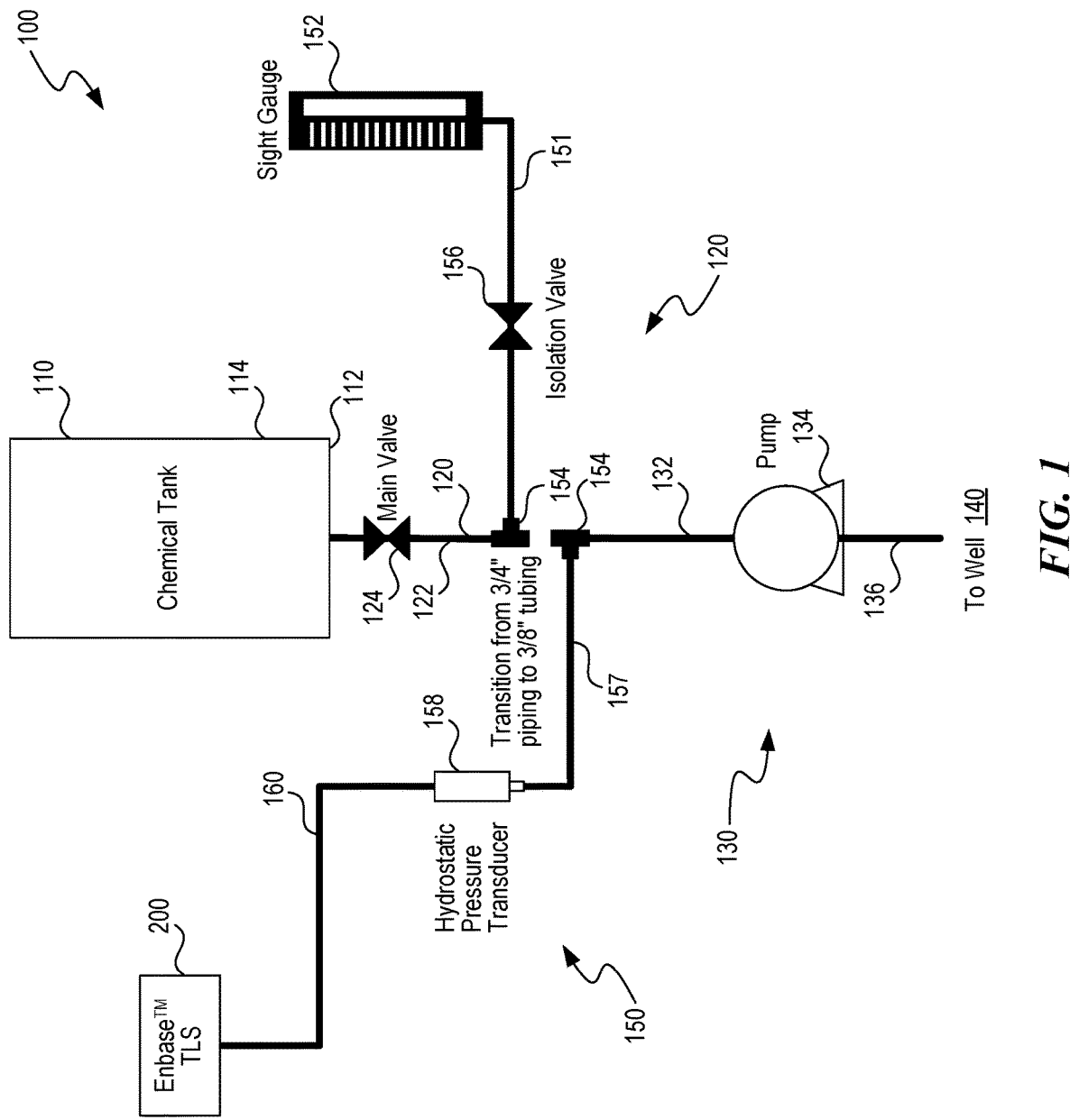
FIG. 1 is a schematic diagram of a chemical tank injection system consistent with the technology of the present application.

With reference now to FIG. 1, a chemical tank injection system 100 is shown. The chemical tank injection system 100 includes a chemical tank 110, which may have a fill port or chemical add port that is not specifically shown. The chemical tank 100 has a discharge manifold 120. The discharge manifold 120 includes an outlet tube 122 in fluid communication with a base 112 of the chemical tank 110. While the outlet tube 122 is shown as coupled to the base 112 of the chemical tank 110, the outlet tube 122 may be coupled to a sidewall 114 of the chemical tank 110 proximal the base 112 in certain embodiments. When the outlet tube 122 is coupled to the base 112 of the chemical tank 110, the hydrostatic pressure in the outlet tube 122 is substantially equal to the hydrostatic pressure at the base 112 of the chemical tank 100. When the outlet tube 122 is coupled to the sidewall 114 of the chemical tank 110, the hydrostatic pressure in the outlet tube 122 may be less than the hydrostatic pressure at the base 112 of the chemical tank 100. The difference would be de minimus in most application, but the pressure differential, such that that is one, may be taken into account.

The manifold 120 also includes an isolation valve 124, which may be referred to as main valve 124, main shutoff valve 124, or shutoff valve 124, in the outlet tube 122 downstream of the chemical tank 110. The isolation valve 124 allows for isolation of the chemical tank 110 from downstream components that may be effected or damaged by operations on the chemical tank 110, such as, for example, a cleaning of the chemical tank 110 or a fill of the chemical tank 110 to name but two (2) examples of uses where the chemical tank 110 may be isolated from downstream components by the isolation valve 124. The outlet tube 122 couples to a pump system 130. The pump system comprises, among other things, an intake 132 in fluid communication with the outlet tube 122, a pump 134 in fluid communication with the intake 132, and a discharge 136 include communication with the pump 132. The discharge 136 is in fluid communication with the wellbore 140 (not specifically shown but referenced) in this exemplary embodiment. The pump system 130 may include pump isolation valves, redundant pumps, and bypass lines and valves, none of which are specifically shown.

The chemical tank injection system 100 also includes a tank level measurement system 150. The tank level measurement system 150, in this case, optionally provides for a sight gauge 152 coupled to the outlet tube 122 downstream of the isolation valve 124 and upstream of the pump system 130. The sight gauge 152 is coupled to the discharge manifold 120 via sight gauge piping 151. The sight gauge 152 is in fluid communication with the outlet tube 122, typically through a T connector 154, to provide a manual means of determining the level of the chemical tank. The sight gauge 152 may be isolated from the outlet tube 122 via a sight gauge isolation valve 156 in the sight gauge piping 151.

The tank level measurement system 150 also provides a pressure sensor 158 in fluid communication with the outlet tube 122. The pressure sensor 158 in this example is a hydrostatic pressure transducer, but other pressure sensors are possible. As shown in this exemplary embodiment, the pressure sensor 158 is coupled to pressure sensor piping 157 that is in fluid communication with the outlet tube 122, typically through a T connector 154. In certain embodiments, the pressure sensor 158 may be installed directly to the outlet tube 122 using a pressure port (not shown) in place of a T connector.

As can be appreciated, operation of the pump 134 causes the pressure in the outlet tube 122 to fluctuate. For example, the pump 134 relies on check valves (not specifically shown) on the intake 132 and the outlet 136 for normal operation. During the suction cycle of a pump stroke the upstream check valve opens and the downstream check valve closes to draw fluid through the intake 132 and into the pump 134, resulting in a pressure decrease on the intake 132 and in the outlet tube 122 upstream of the pump 134. Conversely, during the discharge cycle of the pump stroke the upstream check valve closes and the downstream check valve opens to force fluid through the outlet 136, causing a water hammer that results in a pressure increase in the outlet tube 122. A tank level sensor module 200, also disclosed as the Enbase tank level sensor in this particular exemplary embodiment, compensates for the pressure fluctuations as will be explained further below.

As can be appreciated, the pressure sensor 158 converts the pressure, either in outlet tube 122 or in pressure sensor piping 157, into an electrical signal 160 indicative of the pressure. The electrical signal 160 is sent to the tank level sensor module 200. The tank level sensor module 200 is shown in FIG. 1 as separate from the pressure sensor 158, but could be incorporated into the pressure sensor 158. Additionally, the electrical signal 160 may be transmitted from the pressure sensor 158 to the tank level sensor module 200 through a wired or wireless connection.

Figure 2:
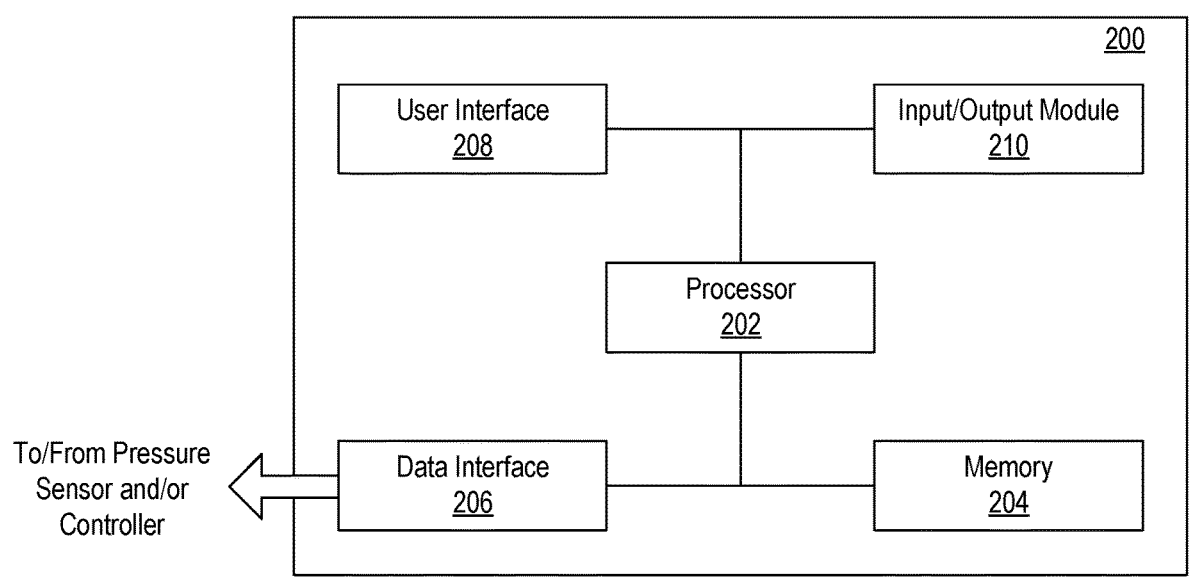
FIG. 2 is a functional block diagram of a tank level sensor module consistent with the technology of the present application.

A functional diagram of the tank level sensor module 200 is shown in more detail in FIG. 2. The tank level sensor module 200 includes a processor 202, such as, for example, a microprocessor, a central processing unit, a desktop computer, a server, a laptop computer, a handheld computer, or the like. The processor 202 controls the major functions of the tank level sensor module 200 including the functional operations described herein below. The processor 202 also processes the various inputs and/or data that may be required to operate the tank level sensor module 202. A memory 204 is interconnected with processor 202. The memory 204 may be remotely located or co-located with the processor 202. The memory 204 also may store data necessary or convenient for operation of the tank level sensor module 200 as will be explained herein. The tank level sensor module 200 further includes a data interface 206 or port to receive and/or transmit data as will be further explained. The data interface 206 may be a combination transmitter/receiver or transceiver to receive and/or transmit data. The tank level sensor module 200 further may include a user interface 208 or a basic input and output module 210 as required for local interaction with the tank level sensor module 200.

Figure 3:
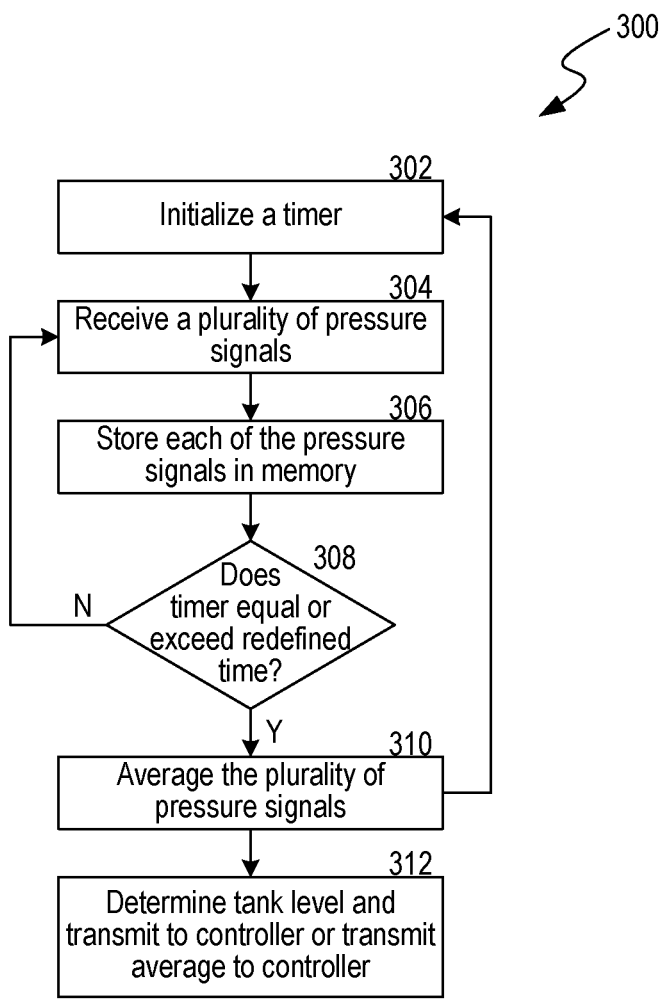
FIG. 3 is an exemplary flowchart of a method of performing the tank level determination consistent with the technology of the present application.

Referring to FIG. 3, a flowchart 300 is provided showing an exemplary methodology for the tank level sensor module 200. The technology of the present application may be considered a filtering or smoothing technology such that the pressure fluctuations do not distort the ability of the sensor in the discharge manifold to determine the tank level using pressure. At a first step, the tank level sensor module 200 has a predefined period of time programmed and initializes a timer in the processor to zero, step 302. The tank level sensor module 200 next receives a plurality of pressure signals from the pressure sensor 158 at a sample rate over a predefined period of time, step 304. The sample rate may be 10 samples per second. Typically, the predefined period of time is defined by the operation of the pump to inject chemicals. The predefined period of time should be sufficient to cover at least one (1) complete pump stroke (or suction, valve slam operation) but generally should be sufficiently long to cover at least two (2) or more complete pump strokes. In one exemplary embodiment, good results were found when the sample window or predefined period of time, was set to about three (3) complete pump strokes. Generally, the predefined period of time, or sampling window, is set to be about 5 seconds. In certain embodiments, the sampling window may be 10 seconds. The pressure sensor 158 pressure signal is typically samples every 100 ms.

The tank level sensor module 200 samples each of the plurality of pressure signals from the pressure sensor 158, step 304. The processor 202 causes each of the pressure signals/samples to be stored in the memory 204, step 306. The pressure signals/samples may be stored in a buffer or cache memory. In certain embodiments, the pressure signals/samples may be stored in a database or the like, such as a relational database, an object-oriented database, a hierarchical database, or the like.

The processor 202 next determines whether the timer equals or exceeds the predefined period of time, step 38. If the processor 202 determines that the timer is less than the predefined period of time, the processor 202 continues to receive samples (step 306), store the samples (step 306), and determine whether the timer equals or exceeds the predefined period of time (step 310). If the processor 202 determines the timer exceeds the predefined period of time, the processor averages the plurality of pressure signals/samples stored in memory 204, step 310. The processor 202 also re-initializes the timer to zero and restarts. The processor 202 may calculate the chemical tank level from the average pressure and transmit the tank level to a chemical tank injection system controller, step 312. Alternatively, the processor 202 next transmits the averaged pressure signal/sample to a chemical tank injection system controller, and the controller calculates the chemical tank level from the averaged pressure signal/sample, step 312.

Figure 4:
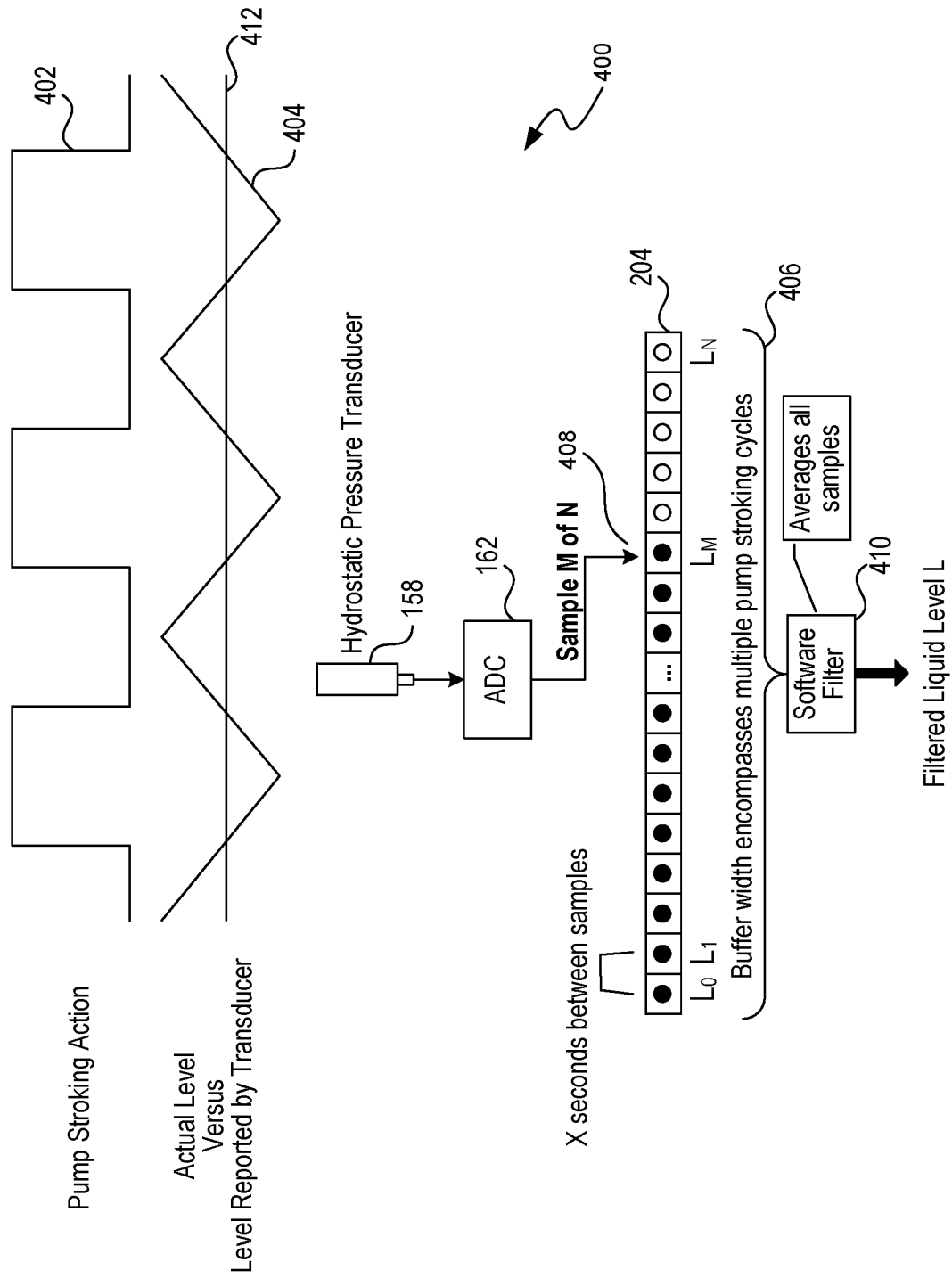
FIG. 4 is a schematic diagram of the operations contained in the flowchart of FIG. 3 consistent with the technology of the present application.
Figure 5:
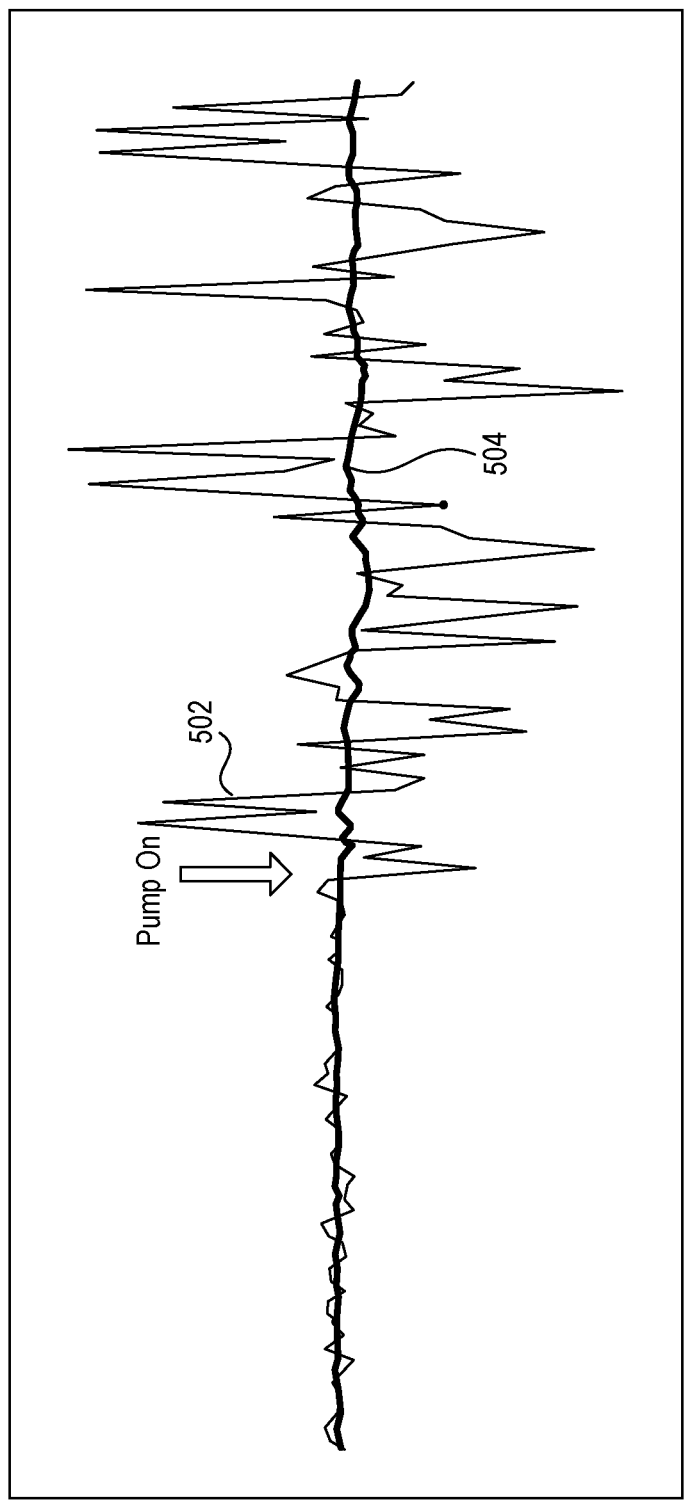
FIG. 5 is a diagram comparing the tank level readings with and without the technology of the present application.
Figure 6:
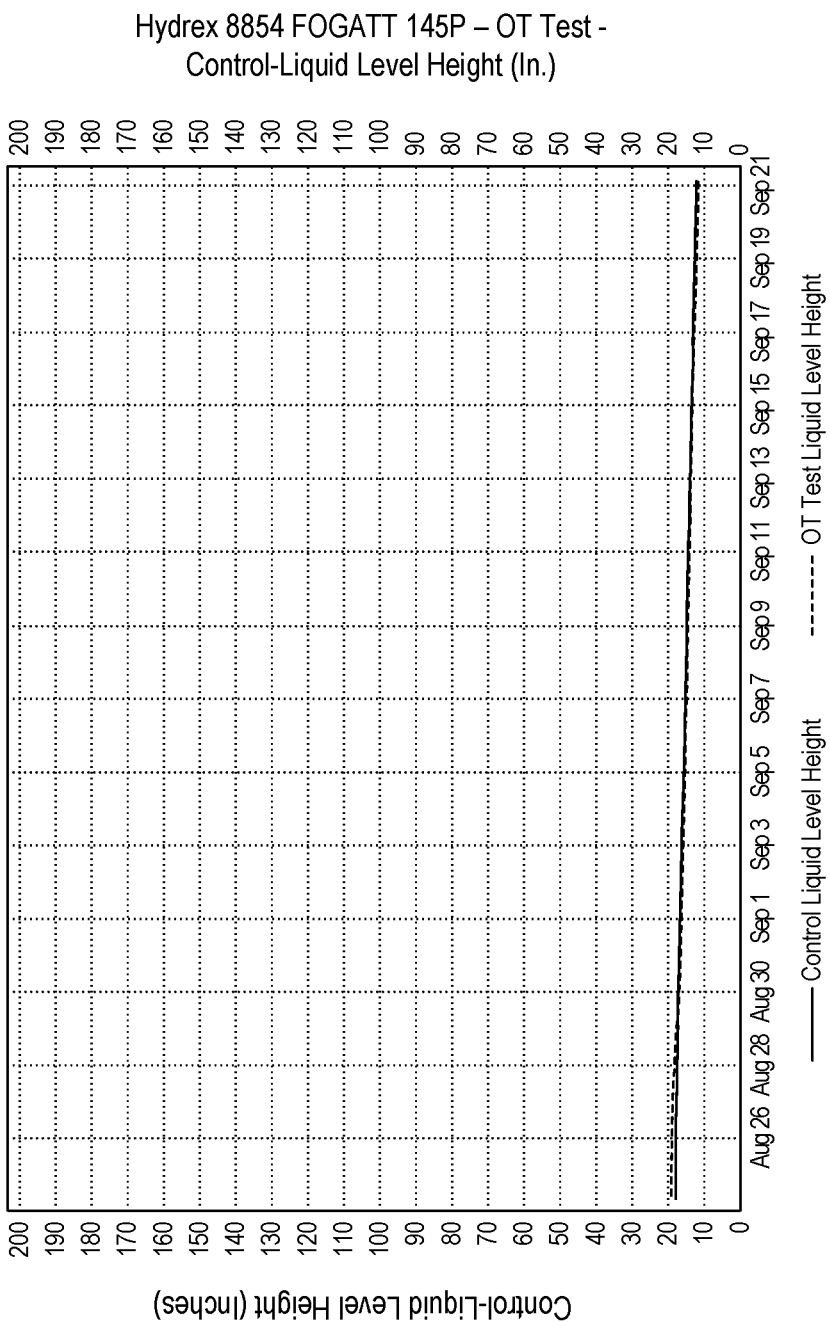
FIG. 6 is a diagram comparing the tank level readings using the technology of the present application and conventional technology.

FIG. 4 is a schematic representation 400 of the operational flowchart 300 described in FIG. 3. FIG. 4 shows a pump stroke, valve slam cycle of three (3) strokes 402 followed by three (3) slams. The pressure change in the outlet tube 122 is shown by line 404. The pressure drops during a valve stroke and subsequently rises during a slam. Line 404 is representative and not actual as the actual pressure is not necessarily a smooth line as shown. The predefined time, or sampling window, for this exemplary schematic representation 400 shown by the sample window 406 receiving samples from time $T_0$ to $T_x$, which may be broken down into sample slots $L_0$ to $L_n$ corresponding to the sample rate and time period. The pressure sensor 158 receives pressure signals that are stored by the tank level sensor module 200 in the memory 204. The electrical signal 160 may be converted from an analog signal to a digital signal by an Analog to Digital Converter 162. During the sample window 406, the processor 202 samples the signal from the pressure sensor 158 to be stored every increment of time as shown by the memory 204 having a memory slot for times $L_0$ to $L_n$. The schematic representation 400 shows pressure signal/sample M 408 of N signals/samples being stored in memory slots $L_0$ to $L_n$ with a present pressure signal/sample $L_m$ being stored. The sample window continues for slots $L_{m+1}$ to $L_n$. Once the sample window is done, the processor 202 of the tank level sensor module 200 averages the samples as shown by filter module 410. The average is transmitted to the controller as discussed above. Line 412 is representative of the level based on the averaging process described above. As can be seen, the line 412 remains relatively flat. FIG. 5 is an actual representation of the tank level using a conventional hydrostatic pressure without the averaging process as shown by the erratic line 502 v. the tank level using a filtering process consistent with the present application as shown by the relatively flat line 504. As can be appreciated, the filtering logic of the present application smooths the tank level reading when the pump is not operating as well as when the pump is operating. While relatively flat line 504 does have some fluctuation, FIG. 6 shows a comparison between a conventional sensor contained in the chemical tank (which is not subject to the pump stroke and valve slam pressure fluctuations and a tank level sensor in the outlet tube 122 using the filtering logic as explained above. As can be seen, the levels are substantially identical.

Figure 7:
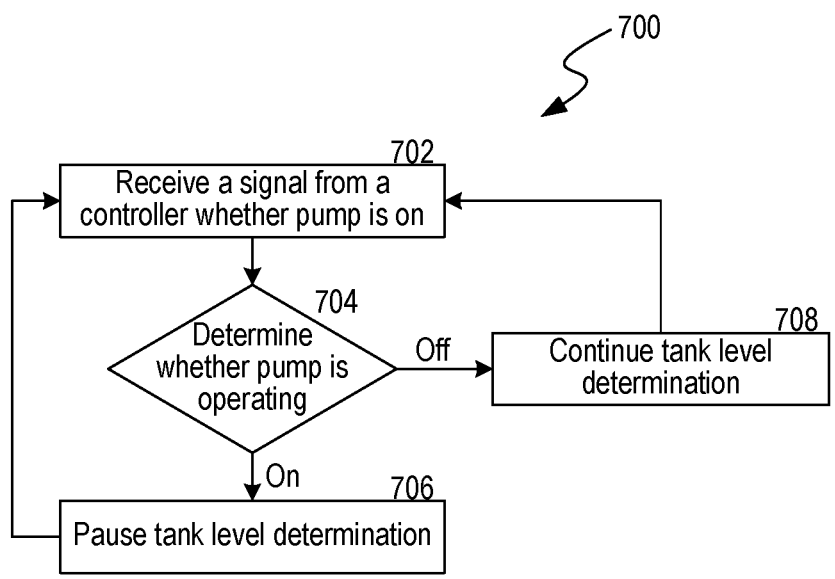
FIG. 7 is an exemplary flowchart of a method of performing the tank level determination consistent with the technology of the present application.

FIG. 7 provides a flowchart 700 showing another exemplary methodology for the tank level sensor module 200. As described above, providing the pressure sensor 158 in the discharge manifold 120 causes the pressure sensor 158 to be sensitive to the pump stroke and/or valve slam. In this case, the tank level sensor module 200 receives a signal from the pump controller regarding whether the pump is operating, which would cause a stroke, slam pressure fluctuation, step 702. Next, the processor 202 determines whether the pump is operating, step 704. If the pump is operating, the processor pauses the tank level determination, step 706. If the processor 202 determines the pump is not operating, the processor 202 continues to determine the chemical tank level in real time using the pressure signal from the pressure sensor 158, step 708. In this case, continues to determine the tank level may include re-initiating the tank level calculation process after a pause while the pump is operating. Additionally, the initiation may provide for sufficient time for the pressure in the discharge manifold to stabilize.

Figure 8:
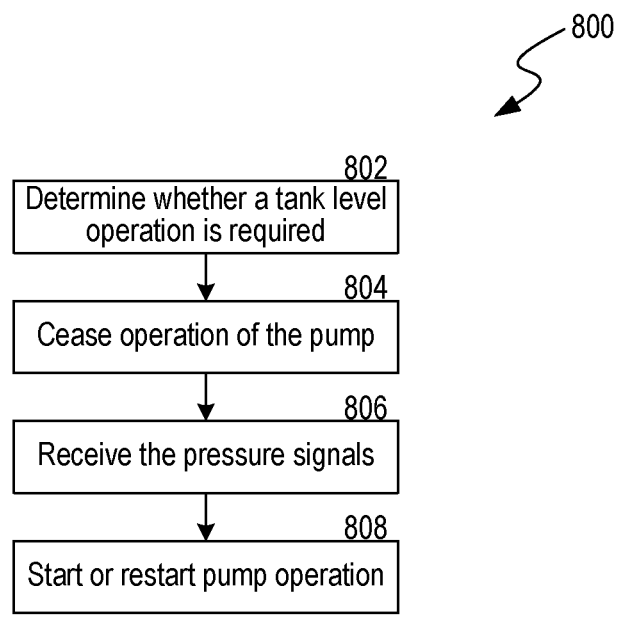
FIG. 8 is an exemplary flowchart of a method of performing the tank level determination consistent with the technology of the present application.

FIG. 8 provides a flowchart 800 showing another exemplary methodology for the tank level sensor module 200. In this exemplary methodology, the tank level sensor 200 determines that a tank level reading operation is required, step 802. Next, the processor 202 sends a signal to the pump controller to cease operation of the pump, step 804. The tank level sensor module 200 receives a pressure signal from the pressure sensor 158 and determines the tank level and/or transmits data to the controller to calculate the tank level, step 806. After the tank level operation is complete, the processor sends a signal to initiate the pump, step 808.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A method for determining a level of a tank filled with fluid for a chemical tank injection system using a hydrostatic pressure in a discharge manifold wherein a pressure sensor used to determine the tank level is located in the discharge manifold between the upstream tank and a downstream pump, the method comprising the steps of:
    establishing a predefined period of time, wherein the predefined period of time is sufficiently long to include at least one stroke and valve slam of the downstream pump;
    initializing a timer to zero and start the timer;
    receive while the pressure sensor is in fluid communication with the downstream pump a plurality of pressure signals at a sample rate over the predefined period of time such that at least one of the pressure signals of the plurality of pressure signals is obtained at a time different from another of the plurality of pressure signals including at least one pressure signal when the downstream pump is stroking and at least one pressure signal when the downstream pump is valve slamming from the pressure sensor configured to determine the fluid pressure in an outlet tube of the discharge manifold;
    cause each of the received pressure signals to be stored in a memory;
    determine whether the timer equals or exceeds the predefined period of time; and
    average the plurality of pressure signals stored in the memory if it is determined that the timer equals or exceeds the predefined period of time; and
    transmit the average of the plurality of pressure signals to a controller configured to control the chemical tank injection system using the average of the plurality of pressure signals to determine the tank level.

2. The method of claim 1 wherein the established predefined period of time is longer than at least two complete pump strokes.

3. The method of claim 2 wherein the established predefined period of time is longer than at least three complete pump strokes.

4. The method of claim 1 wherein the step of averaging the plurality of pressure signals further comprises eliminating a highest-pressure signal and a lowest-pressure signal prior to averaging the plurality of pressure signals.

5. A tank level senor module configured to determine a hydrostatic pressure of a chemical tank of a chemical tank injection system using a pressure sensor configured to sense the pressure in a discharge manifold downstream from the tank and upstream of a pump, the tank level sensor module comprising:
    a timer configured to measure a predefined period of time, wherein the predefined period of time includes at least one pump stroke and valve slam cycle;
    a processor configured to receive a plurality of pressure signals from the pressure sensor over the predefined period of time such that at least one of the plurality of pressure signals is received at a time different than another of the plurality of pressure signals when the pump is in fluid communication with the pressure sensor including at least one pressure signal when the downstream pump is stroking and at least one pressure signal when the downstream pump is valve slamming;
    a memory configured to store the plurality of pressure signals received by the processor; and;
    a transmitter configured to transmit data to a controller of the chemical tank injection system, wherein
    the processor is configured to determine when the timer equals or exceeds the predefined period of time and to average the plurality of pressure signals stored in the memory, such that the data transmitted to the controller of the chemical tank injection system receives an average pressure signal to determine the tank level.

6. The tank level senor module of claim 5 wherein the predefined period of time is equal to at least one complete pump stroke.

7. The tank level sensor module of claim 5 wherein the predefined period of time is no less than at least two complete pump strokes.

8. The tank level sensor module of claim 5 wherein the processor receives at least one pressure signal for a each of a plurality of sample windows.

9. The tank level sensor module of claim 8 wherein the processor eliminates a highest-pressure signal and a lowest-pressure signal prior to averaging the plurality of pressure signals.

10. The tank level sensor of claim 8 wherein each sample window is at least 3 seconds.

11. The tank level sensor of claim 8 wherein each sample window is no more than 7 seconds.

12. A chemical tank injection system comprising:
a chemical tank having a base and a sidewall;
a discharge manifold in fluid communication with the chemical tank such that the pressure in the discharge manifold is substantially equal to a hydrostatic pressure in the chemical tank, the discharge manifold comprising at least an outlet tube and an isolation valve;
a pump assembly in fluid communication with the discharge manifold downstream of the isolation valve, the pump assembly comprising an intake in fluid communication with the outlet tube, a pump, and a discharge;
a pressure sensor in fluid communication with at least one of the outlet tube downstream of the isolation valve and upstream of the pump assembly or the intake of the pump assembly such that the pressure sensor and the pump assembly are in fluid communication; and
a tank level sensor module operationally coupled to the pressure sensor to receive a plurality of pressure signals form the pressure sensor while the pressure sensor is in fluid communication with the pump assembly, the tank level sensor comprising at least a processor and a memory wherein the processor is configured to receive a plurality of pressure signals from the pressure sensor over a sample window, wherein the sample window comprises at least one pump stroke and valve slam of the pump, at a sample rate such that at least one of the plurality of pressure signals is received at a time different from another of the plurality of pressure signals including at least one pressure signal when the downstream pump is stroking and at least one pressure signal when the downstream pump is valve slamming and calculate an average pressure signal based on the plurality of pressure signals received over the sample window and the memory is configured to store the plurality of pressure signals.

13. The chemical tank injection system of claim 12, wherein the discharge manifold is coupled to the base of the chemical tank.

14. The chemical tank injection system of claim 12 comprising a sight gauge.

15. The chemical tank injection system of claim 12 comprising a T connector located between and in fluid communication with the discharge manifold and the pump, wherein the pressure sensor is in fluid communication with at least one of the outlet tube downstream of the isolation valve and upstream of the pump assembly or the intake of the pump assembly through the T connector.

16. The chemical tank injection system of claim 12 wherein the pump assembly further comprises a check valve.

17. The chemical tank injection system of claim 12 wherein the pressure sensor is a hydrostatic pressure transducer.

18. The chemical tank injection system of claim 17 wherein the hydrostatic pressure transducer is operatively coupled to the outlet tube through a pressure port.

19. The chemical tank injection system of claim 12 wherein the pressure sensor in fluid communication with at least one of the outlet tube downstream of the isolation valve and upstream of the pump assembly or the intake of the pump assembly via pressure sensor piping.

20. The chemical tank injection system of claim 12 wherein the tank level sensor module is operationally coupled to the pressure sensor through a wireless connection.

\* \* \* \* \*